United States Patent [19]

Lemaitre

[11] 4,280,639

[45] Jul. 28, 1981

[54] DISPENSER FOR GRANULAR OR POWDERED PRODUCT WITH CRENELLATED DISPENSING BLADE

[76] Inventor: Gerard Lemaitre, La Creuse de Saint-Eanne, 79800 La Mothe Saint Heray, France

[21] Appl. No.: 49,293

[22] Filed: Jun. 18, 1979

[51] Int. Cl.$^3$ ............................................. G01F 11/10
[52] U.S. Cl. .................................. 222/217; 222/342; 222/370
[58] Field of Search ............... 222/227, 239, 240, 241, 222/242, 254, 342, 345, 348, 370, 216, 217, 220; 221/265, 233; 366/184, 194, 195, 196

[56] References Cited

U.S. PATENT DOCUMENTS

| | | | |
|---|---|---|---|
| 1,834,721 | 12/1931 | Mitchell | 222/348 |
| 3,101,872 | 8/1963 | Dickinson | 222/242 X |
| 3,229,860 | 1/1966 | Fabian | 222/220 X |
| 3,263,866 | 8/1966 | Proctor | 222/242 X |
| 3,268,118 | 8/1966 | Hoenisch | 222/227 X |
| 4,126,250 | 11/1978 | Gram | 366/195 X |
| 4,167,248 | 9/1979 | Akazawa et al. | 222/242 X |

*Primary Examiner*—Stanley H. Tollberg
*Assistant Examiner*—Fred A. Silverberg
*Attorney, Agent, or Firm*—Richard L. Johnston

[57] ABSTRACT

A dispenser is provided which is adapted to be used in connection with a hopper for distribution of a granular and/or powdered product, said dispenser having a rotary star-shaped distributor on which is mounted a plurality of crenellated radial blades which upon rotation move between two parallel walls at right angles to the axis of rotation, one wall being an upstream wall and the other a downstream wall, each having at least one cut-out nonaligned with the cut-out in the other, one cut-out being an inlet on the upstream wall and another one an outlet on the downstream wall, the upstream wall having on its inner face at least one stud which is disposed in line with the outlet and the edge of each crenellated radial blade being so crenellated that the recessed surface of the crenellation matches the projecting stud or studs of the upstream wall whereby a constant measured quantity of granular and/or powdered product is dispensed.

7 Claims, 2 Drawing Figures

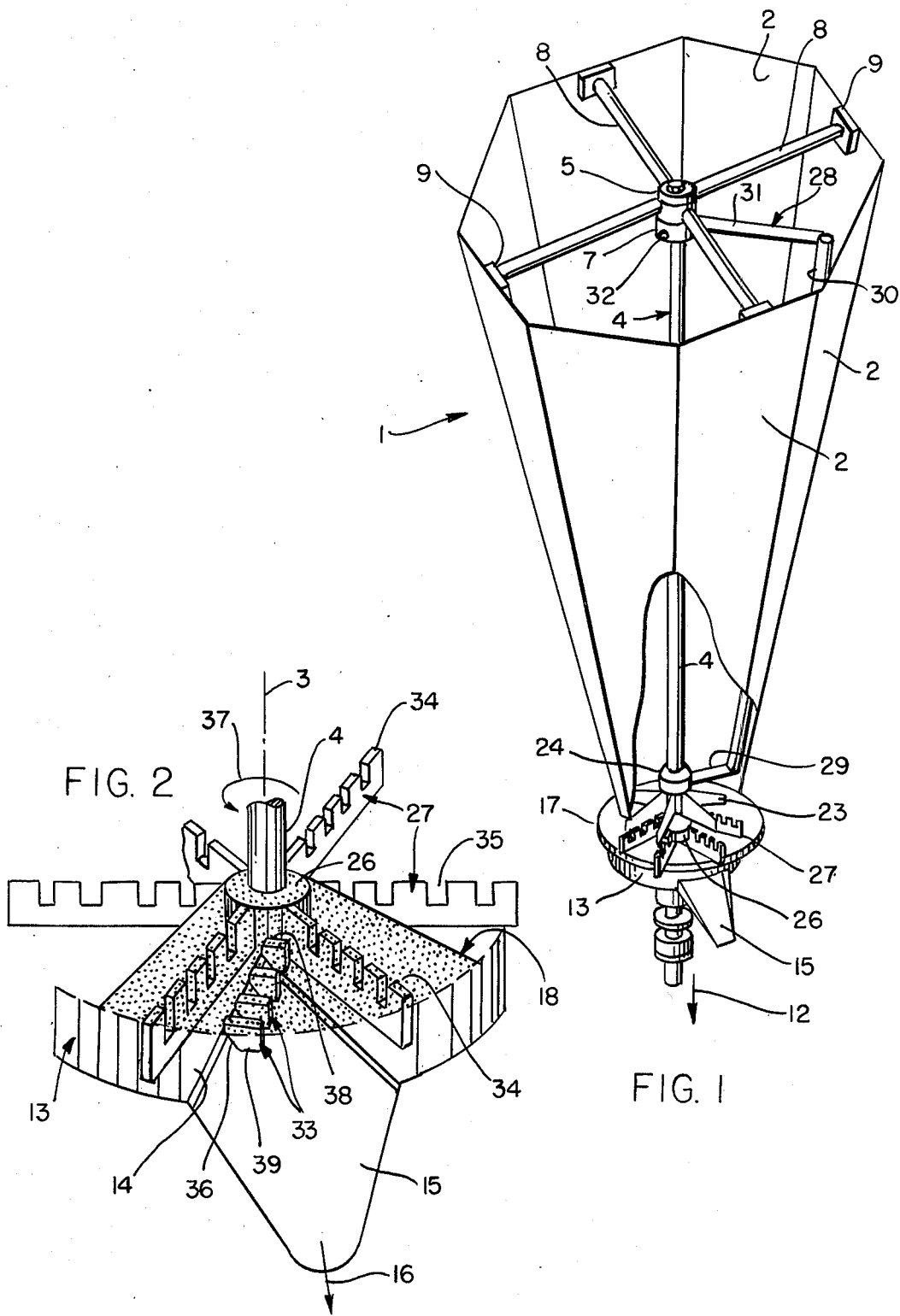

DISPENSER FOR GRANULAR OR POWDERED PRODUCT WITH CRENELLATED DISPENSING BLADE

BACKGROUND

The present invention relates to a volumetric drum dispenser for the distribution of a granular and/or powdered product, particularly a caking product such as powdered milk and more particularly powdered milk which has been "re-enriched dry". (This term will be explained hereinafter). Such a volumetric drum dispenser finds one of its essential applications in equipment intended for the quasi-natural feeding of young animals, particularly calves or lambs. It is indeed known that plants exist for the feeding of young animals by means comparable with natural feeding. In such installations, the nourishment sought by calves and lambs from teats secured to boxes or compartments is a milk resulting from the mixture and dissolution in a mixing bowl of powdered milk and water. In such installations, the powdered milk is contained in a hopper located directly above the mixing bowl. The water required for mixing generally originates from a reservoir inside the installation. Pipes carry the milk obtained by blending and dissolution of the powder in the water from the mixing bowl to the teats which constitute the only elements accessible to the young animals.

Of course, such installations have enjoyed progressive development so that they permit of automatic, immediate and accurately measured preparation and dispensing of the food with which the animals are to be provided. To ensure that the food distributed is of constant quality, particularly with regard to its composition, it is necessary to introduce into the mixing bowl at a precise moment in time a known quantity of water and the corresponding known quantity of powdered milk so that, taken as a whole, the solution contained in the mixing bowl is not altered.

In such installations, it is therefore advantageous to provide between a hopper which contains the reserve milk powder and the mixing bowl a drum device to allow distribution of the powdered milk to the bowl in definite volumetric quantities.

Furthermore, it is known that there are two types of powdered milk, powdered milk re-enriched dry and powdered milk re-enriched by the wet method.

The first type of milk is obtained by spraying a mist of fatty substances over grains of milk powder falling inside a plant consisting essentially of a vertical shaft; each grain of powder is thus enveloped in fatty substances by a dry method, hence the reference to milk which has been re-enriched dry.

The other type of milk is obtained by evaporation of the water from a mixture of milk and fat: in such a case, in contrast to the previously mentioned product, it is then the milk powder which envelops a mass of fatty substances. It is furthermore known that the presence of vegetable fats is particularly desirable in powdered milk, vegetable fat having the advantage of being more easily digested by young animals and furthermore providing a better quality of meat as well imparting better keeping properties to the meat for cold room storage.

By virtue of the process of producing dry re-enriched powdered milk, the casing of fat formed around each grain of milk consists of a mixture of animal and vegetable substances.

It is impossible on the other hand to incorporate vegetable fat into powdered milk which is re-enriched by the wet method, because these vegetable substances burn at a very high temperature when the mixture of fat and milk is dried. The most advantageous type of powdered milk, therefore, is without any possible doubt powdered milk which is re-enriched dry.

It is however evident that the use of this type of powdered milk is particularly difficult, because above a temperature in the region of 30° C., the grains of powder stick to one another, a type of agglomeration which is due to the coating of fats which commence to liquefy.

If the grains of powder stick to one another and form agglomerates, the annoying result of this is to give the product poor flowing qualities, both from the hopper which forms the reserve of powdered milk and from the volumetric device for dispensing this powder placed downstream of the hopper and upstream of the mixing bowl.

In the known installations, the volumetric drum dispenser comprises a star-shaped rotary distributor consisting of a cylindrical hub on which are mounted a plurality of radial blades, which, upon rotation of the hub about its longitudinal axis, move within two parallel walls at right-angles to the said axis, an upstream and a downstream wall in each of which there is at least one cut-out, referred to as an inlet on the upstream wall and an outlet on the downstream wall and so provided that no outlet is even partially located opposite an inlet.

Such a star-shaped rotary distributor functions therefore in the same way as a lock. The measured amount of product is contained in each compartment or chamber bounded by two radial blades which product is automatically distributed through the outlet orifice of the dispenser after the rear blade of the chamber arrives in line with the outlet orifice.

However, in the case of powdered milk when the grains stick to one another, the theoretically regular distribution of a measured dose of product is in reality quite irregular. The milk agglomerates and sticks to the radial blades. Instead of becoming detached from these blades as they pass over the outlet orifice, it remains clinging and is recycled together with the milk reserve still contained in the hopper. The quantity of product then distributed by the chambers at the level of the outlet orifice will therefore vary from one moment to another according to the quantity of milk left clinging to the blades.

This irregular distribution of the powdered milk has an obvious disadvantage with regard to the concentration of nourishment which it is desired to form in the mixing bowl. Indeed, such a concentration could not then be stable since conversion of the powdered milk to solution will vary at each distribution by the drum dispenser, according to the degree of agglomeration of the powdered milk to the walls of the star-shaped distributor. The young animals therefore absorb nourishment but the quantity of milk is completely indeterminate.

In other words, while it would be desirable always to use powdered milk which has been re-enriched dry for its nutrient properties, it is necessary to forgo using this type of milk in favour of powdered milk which is re-enriched by the wet method as soon as it ceases to flow suitably and normally from the volumetric drum dispenser into the mixing bowl; such a substitution of product is necessary as soon as it becomes hot, that is to say in summer and sometimes even in spring.

An object of the present invention is to alleviate the aforesaid disadvantages by providing a volumetric drum dispenser permitting the distribution of a granular and/or powdered product and in particular the distribution of a caking product such as powdered milk which is re-enriched dry.

BRIEF SUMMARY OF THE INVENTION

According to one aspect of the present invention, there is provided a volumetric drum dispenser for the distribution of a granular and/or powdered product, particularly a caking product such as powdered milk, comprising a rotary star-shaped distributor consisting of a cylindrical hub on which are mounted a plurality of radial blades which, upon rotation of the hub about its longitudinal axis, move between two parallel walls at right-angles to the said axis, i.e. an upstream wall and a downstream wall, each having at least one cut-out, referred to as an inlet on the upstream wall and an outlet on the downstream wall, and arranged in such a way that no outlet is even partially opposite an inlet, the outlet being furthermore open over a sector of a circle substantially equal to the sector comprised between an adjacent pair of the radial blades of the distributor, the upstream wall having on its inner face at least one stud which is disposed in line with the outlet, and the edge of each blade which adjoins the said face carrying the stud being so crenellated, that the recessed surface of the crenellation matches the projecting inner surface of the upstream wall.

DETAILED DESCRIPTION OF THE INVENTION

It will therefore be seen that during rotation of the star-shaped distributon, the stud(s) allow(s) passage of each blade which by virtue of its crenellated edge very closely fits around the stud or studs on the dispenser. The assembly comprising stud and crenellated blade can be likened to a comb and a counter-comb and the relative movement of the studs and of a blade produces detachment of the measured quantity of powdered milk as the blade moves towards the studs. The full measured quantity of powder is distributed then by the outlet orifice, and consequently the exact concentration of the liquid formed in the mixing bowl may be known at any given moment. In the more usual apparatus, the longitudinal axis of rotation of the hub of the dispenser is vertical and the upstream and downstream walls are horizontal.

In other preferred forms of embodiment, the inner face of the upstream wall of the dispenser is provided with a plurality of studs disposed in a line; the line of studs is disposed for example at a line bisecting the open orifice in the downstream wall; the working face of each stud is inclined rearwardly in the direction of rotation of the blades, from the base to the tip of the said stud; the working face of each stud may be flat or curved.

According to a further aspect of the present invention there is provided an apparatus for the quasi-natural feeding of young animals, which apparatus includes a volumetric drum dispenser as defined hereinbefore.

In order that the subject of the present invention may be the better understood, an embodiment of the present invention will now be described by way of purely illustrative and non-limitative example, with reference to the accompanying drawings, in which:

FIG. 1 is a schematic perspective view of the top part of an apparatus for the quasi-natural feeding of young animals. In this illustration, the base of the lateral wall of the hopper has been broken away to show the volumetric drum dispenser, and FIG. 2 is a detailed but diagrammatic perspective view of an embodiment of a volumetric drum dispenser according to the invention.

Referring to the drawings, it will be seen that reference numeral 1 generally denotes a hopper in the form of an inverted regular truncated pyramid. This hopper has eight lateral faces 2 each of exactly the same configuration, the cross-section of the said hopper being formed by a regular octagon.

Disposed along the vertical axis 3 of the hopper is a shaft 4 on the top end of which is a force-fitted ring 5. This ring is supported by a bearing 7 within which it is free to turn. Four radial arms 8 welded on the outer lateral face of the bearings 7 allow adjustment of the aforesaid assembly in relation to the vertical axis 3 of the hopper. For this purpose, the arms 8 are disposed at 90° to one another and their free ends are each provided with a screw-threading which passes through the wall 2 at the level of a radially pierced block 9 to cooperate with a nut which can be tightened to a greater or less degree in order accurately to regulate the rotary assembly along the axis 3.

In its lower part, the shaft 4 is driven by a motor reduction unit (not shown) connected to the chassis (not shown) of the animal feeding apparatus. The connecting element between the aforesaid system and the motor reduction unit, indicated diagrammatically by the arrow 12, is a flexible coupling. At the junction of the hopper 1 and of the chassis (not shown) of the machine is placed a cup 13, the bottom of which 14 has a cut-out extending over a sector of approx. 60°, a chute 15 welded to the said bottom framing the cut-out and extending downwardly to convey the product which is to be distributed from the hopper 1 to the mixing bowl, as indicated diagrammatically by the arrow 16. In order to facilitate the flow of product, the chute may be made of or coated with a "non-stick" material such as polytetrafluoroethylene, available for example under the Registered Trade Mark TEFLON.

A collar 17 is welded on the lateral wall of the cup 13, on the upper part thereof.

A plate 18, shown only in FIG. 2 in order to simplify the understanding of FIG. 1, is fixed over the collar 17 by nuts and bolts. The plate 18 is open over its entire part which is in line with the bottom of the cup 13, except in the zone directly above the cut-out in the said bottom. In other words, for each solid area in the bottom of the cup there is a corresponding cut-out in the plate 18 and vice versa. Above the plate 18, there is fixed to the shaft 4 a ramming means consisting of six blades 23 extending radially from a central ring 24.

Between the plate 18 and the bottom 14 of the cup 13 there is keyed onto the shaft 4 a rotary star-shaped distributor consisting of a cylindrical hub 26 from which radially extend six blades 27 disposed regularly about the hub, below the blades 23, the blades 27 defining, in pairs, compartments or chambers intended to contain the measured quantity of powdered milk which, on demand, is to be passed to the mixing bowl. The ramming means and the rotary distributor move in rotary fashion in the same way one on either side of the plate 18 as the central shaft 4 rotates.

The star-shaped rotary distributor, completed by the plate 18 and the bottom 14 of the cup 13, constitutes the volumetric drum dispenser. This drum dispenser, together with the hopper 1, forms the upper part of an apparatus for the quasi-natural feeding of young animals.

It should furthermore be noted that the disposition of the plate 18 and of the bottom of the cup 13 creates a kind of lock, the purpose of which is to ensure consistency of the measured doses of milk distributed. The plate is thus referred to as upstream wall and the bottom 14 of the cup is referred to as the downstream wall, the inlet to the lock being constituted by the entire cut-out area of the plate and the outlet from the lock being constituted by the cut-out which is immediately above the chute 15. It will be observed that the inlet and the outlet are not immediately opposite each other, in order to avoid the product flowing directly from the hopper 1 through the chute 15 without passing through the dispenser. To encourage detachment of the powdered milk during rotation of the star-shaped distributor, there is on the inner face of the upstream wall 18 of the lock a plurality of studs 33 disposed in line with the outlet from the lock. Complementary to the projecting studs, the upper edge 34 of each blade 27, that is to say the edge adjoining the plate 18, is crenellated in such a way that the recessed surface 35 of the crenellations matches the projecting inner surface of the upstream wall 18 of the lock. It is advantageous for a plurality of studs to be disposed in a line, being for example four in number as shown in the drawing. Of course, having a plurality of studs favours detachment of the product to be distributed. Similarly, the studs disposed in a line are placed in the first half (with respect to the direction of rotation of the blades 27) of the zone situated directly above the chute 15, as far as the line bisecting the open outlet in the downstream wall, so that detachment occurs at the beginning rather than at the end of the cut-out sector which constitutes the outlet to the chute.

Also for encouraging this freeing of material, the active face 36 of each stud is inclined towards the rear, in the direction of rotation 37 of the blades, from the base towards the tip of the studs.

The active face of each stud is either curved or flat and in the embodiment shown each stud takes the form of a trapezium, the large base of which is constituted by its attachment 38 to the plate 18 while the small base is constituted by its tip 39.

By virtue of the cooperation of the studs and of the crenellated recess, the measured quantities of powdered milk therefore flow out one by one and in accordance with a perfectly determined constant quantity, at each sixth of a rotation of the shaft 4.

It has just been seen that when the chamber of the dispenser is above the chute, the studs automatically and completely detach the measured quantity. In order that distribution may be constant, it is necessary of course to ensure first that the chamber has been completely filled. Therefore, it is as well to provide maximum opportunity for flow of product from the hopper to the drum dispenser. In this respect, the optimum combination of means is as follows: there is placed on the shaft 4 a scraper arm 28 consisting of a first side 29 at right-angles to the shaft 4, welded on the hub 24, a second arm 30 parallel with the inclined wall 2 of the hopper and a third arm 31 parallel with the arm 29 and welded on a ring 32 fixed on the shaft 4.

The apparatus then functions as follows: the powdered milk, for example milk which has been re-enriched dry, is poured into the hopper. Starting the motor reduction unit leads to rotation of the shaft 4 and of all the rotating elements, that is to say drum dispenser and scraper arm. The static loading of the powder and the rotation of the ramming means then convey this powder to the entrance to the lock. The powdered milk then flows through this entrance into the chamber of the dispenser which is situated below the ramming means, this filling of chambers occurring during a part of the rotation of the drum dispenser.

When the chamber of the dispenser which is situated above the chute has been emptied of the measured quantity which it contains, it is again filled when it reaches the entrance to the lock.

The hopper which is shown in the drawings and described hereinbefore is particularly described and claimed in the Complete Specification and for copending United States Application Ser. No. 42,930, filed of even date herewith.

Naturally, the invention is not confined either to the application or to the form of embodiment which have been mentioned and it is possible to conceive of various alternatives without thereby departing from the framework of the present invention as defined by the appendant claims.

The word "adjoins" as employed in the Specification and claims is intended to be interpreted broadly. That is to say it covers both the situation where a blade is merely adjacent to and spaced from the upstream wall and the situation where there is actual sliding contact between a blade and the upstream wall.

What I claim is:

1. A volumetric drum dispenser for the distribution of a granular and/or powdered product, particularly a caking product such as powdered milk, comprising a rotary star-shaped distributor comprising a cylindrical hub on which are mounted a plurality of radial blades which, upon rotation of the hub about its longitudinal axis, move between two parallel walls at right-angles to the said axis, i.e. an upstream wall and a downstream wall, each of said walls having at least one cut-out, referred to as an inlet on the upstream wall and an outlet on the downstream wall, and arranged in such a way that no outlet is even partially opposite an inlet, the outlet being furthermore open over a sector of a circle substantially equal to the sector comprised between an adjacent pair of the radial blades of the distributor, the upstream wall having on its inner face a plurality of projecting studs which are disposed in line with the outlet, and each of said blades which adjoins the said face carrying the studs having a plurality of crenellations radially along the blades so that the crenellations match the projecting studs of the upstream wall.

2. A dispenser according to claim 1, wherein the longitudinal axis of rotation of the said hub is vertical and wherein the said upstream and downstream walls are horizontal.

3. A dispenser according to claim 1 or 2, wherein the said inner face of the said upstream wall carries said plurality of studs disposed in a line.

4. A dispenser according to claim 3, wherein the line of studs is disposed substantially at the line bisecting the said outlet of the said downstream wall.

5. A dispenser according to claim 1, wherein the operative faces of said studs are inclined rearwardly, in the intended direction of rotation of the blades, from the base towards the tip of the said studs.

6. A dispenser according to claim 1, wherein the operative faces of said studs are planar, said studs taking the form of a trapezium, the large base of which is constituted by its attachment to the upstream wall and the small base of which is constituted by its tip.

7. A dispenser according to claim 1, wherein the operative faces of said studs are curved.

* * * * *